US010012286B2

(12) United States Patent
Haller et al.

(10) Patent No.: US 10,012,286 B2
(45) Date of Patent: Jul. 3, 2018

(54) VEHICLE VIBRATION DEVICE

(71) Applicant: GRAMMER AG, Amberg (DE)

(72) Inventors: Erwin Haller, Birgland (DE); Jens Kolb, Koenigstein (DE)

(73) Assignee: GRAMMER AG, Amberg (DE)

( * ) Notice: Subject to any disclaimer, the term of this patent is extended or adjusted under 35 U.S.C. 154(b) by 29 days.

(21) Appl. No.: 15/375,709

(22) Filed: Dec. 12, 2016

(65) Prior Publication Data

US 2017/0167566 A1   Jun. 15, 2017

(30) Foreign Application Priority Data

Dec. 14, 2015   (DE) .......................... 10 2015 121 764

(51) Int. Cl.
| B60N 2/02 | (2006.01) |
| F16F 15/023 | (2006.01) |
| B62D 33/06 | (2006.01) |
| B60N 2/50 | (2006.01) |
| B60N 2/52 | (2006.01) |
| F16F 15/027 | (2006.01) |
| B60N 2/39 | (2006.01) |

(52) U.S. Cl.
CPC .............. *F16F 15/023* (2013.01); *B60N 2/39* (2013.01); *B60N 2/502* (2013.01); *B60N 2/506* (2013.01); *B60N 2/522* (2013.01); *B62D 33/0604* (2013.01); *B62D 33/0608* (2013.01); *F16F 15/027* (2013.01); *B60N 2002/0212* (2013.01); *F16F 2228/066* (2013.01)

(58) Field of Classification Search
CPC ....... B60N 2/505; B60N 2/0244; B60N 1/262
USPC ................................. 248/157, 421, 560, 638
See application file for complete search history.

(56) References Cited

U.S. PATENT DOCUMENTS

| 1,650,178 A | 11/1927 | Atkinson |
| 3,882,956 A | 5/1975 | Plegat |
| 5,107,556 A | 4/1992 | Haider |
| 5,685,605 A | 11/1997 | Kassai et al. |

(Continued)

FOREIGN PATENT DOCUMENTS

| CH | 704 322 A2 | 7/2012 |
| DE | 44 25 680 A1 | 1/1996 |

(Continued)

OTHER PUBLICATIONS

Search Report prepared by the German Patent Office dated Nov. 2, 2016, for German Patent Application No. 10 2015 121 764.3.

(Continued)

*Primary Examiner* — Steven M Marsh
(74) *Attorney, Agent, or Firm* — Sheridan Ross P.C.

(57) ABSTRACT

Vehicle vibration device for a vehicle seat or a vehicle cabin, comprising a lower part and an upper part which is resiliently mounted relative to the lower part by a damper means, wherein the upper part is mounted in a suspended manner on the lower part by means of at least one pivot bearing, wherein the at least one first pivot bearing comprises at least one first lever, the first end of which is attached to the lower part by a first pivot axis and the second end of which is attached to the upper part by a second pivot axis, wherein the second end is located below the first end when viewed in a vertical direction, wherein at least the position of the first end of the lever can be changed by an adjustment means.

12 Claims, 11 Drawing Sheets

(56) References Cited

U.S. PATENT DOCUMENTS

| | | | |
|---|---|---|---|
| 6,550,740 B1* | 4/2003 | Burer | B60N 2/502 |
| | | | 248/370 |
| 7,246,836 B2* | 7/2007 | Hahn | B60N 2/502 |
| | | | 296/65.02 |
| 7,413,158 B1* | 8/2008 | Burer | B60N 2/42736 |
| | | | 248/421 |
| 8,707,477 B1 | 4/2014 | Flemister | |
| 8,894,152 B2* | 11/2014 | Lorey | B60N 2/502 |
| | | | 248/421 |
| 9,694,727 B2* | 7/2017 | Haller | B60N 2/505 |
| 9,758,078 B2* | 9/2017 | Haller | B60N 2/505 |
| 2004/0159763 A1* | 8/2004 | Mullinix | B60N 2/501 |
| | | | 248/421 |
| 2013/0206949 A1* | 8/2013 | Archambault | B60N 2/525 |
| | | | 248/421 |
| 2016/0207430 A1* | 7/2016 | Haller | B60N 2/501 |

FOREIGN PATENT DOCUMENTS

| | | |
|---|---|---|
| DE | 203 03 429 U1 | 7/2004 |
| DE | 2005 009 830 U1 | 8/2005 |
| DE | 10 2005 028 725 A1 | 1/2006 |
| DE | 10 2009 031 417 A1 | 7/2009 |
| DE | 10 2010 053 752 A1 | 6/2012 |
| DE | 10 2015 204 516 A1 | 3/2015 |
| WO | WO 2007/058572 A1 | 5/2007 |
| WO | WO 2009/054788 | 4/2009 |

OTHER PUBLICATIONS

Extended Search Report for European Patent Application No. 16200147.3, dated May 10, 2017, 3 pages.

* cited by examiner

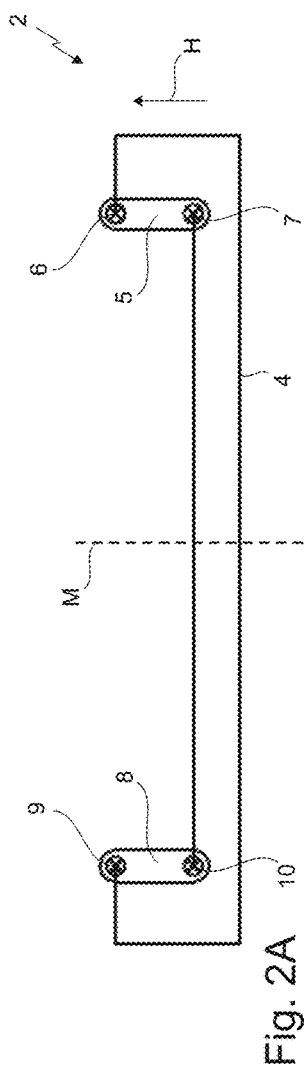
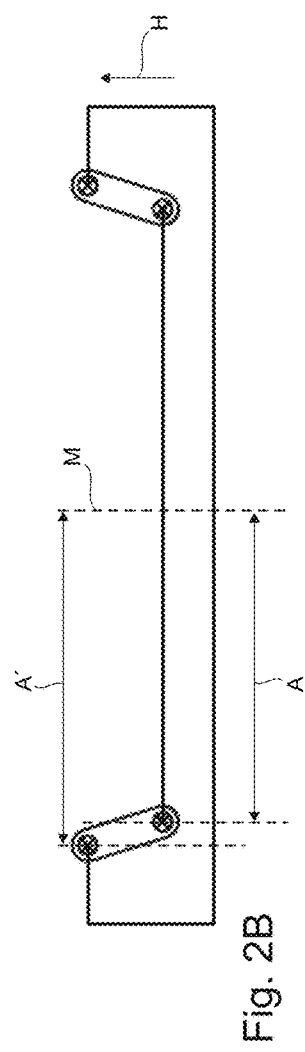
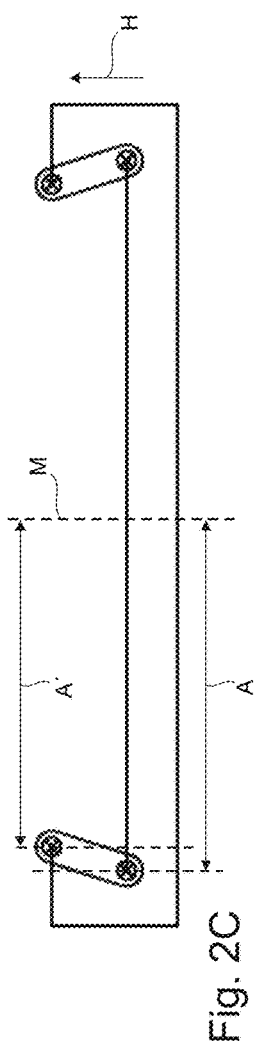

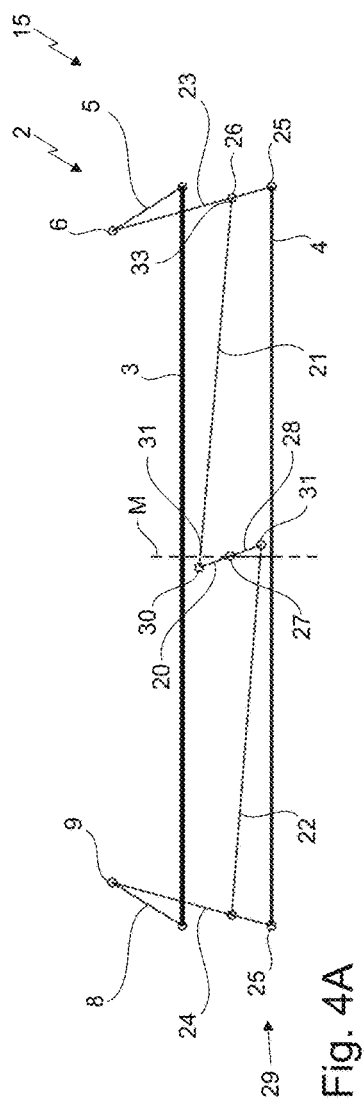
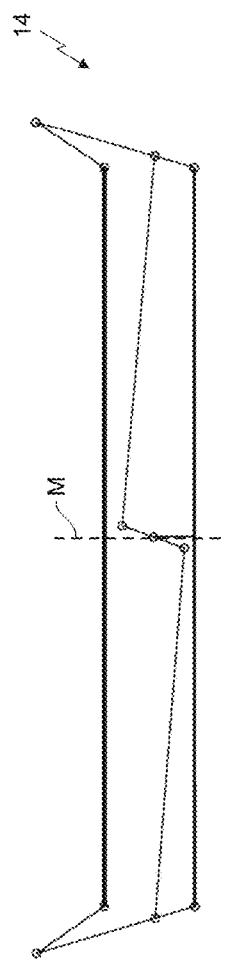
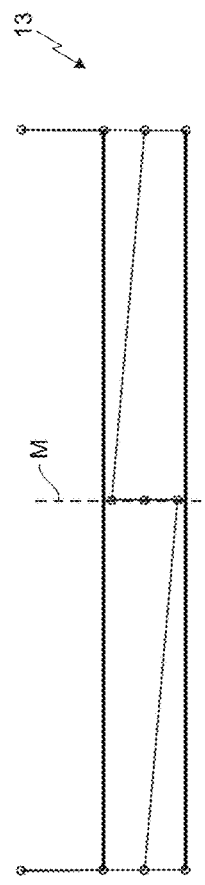
Fig. 4A
Fig. 4b
Fig. 4C

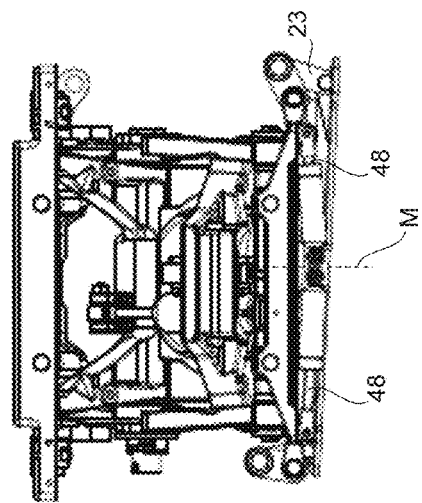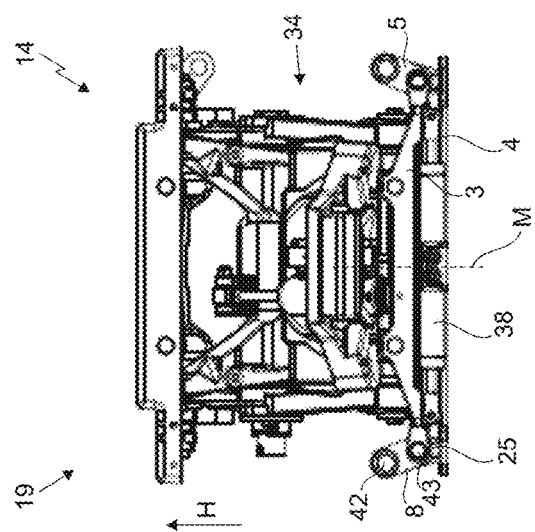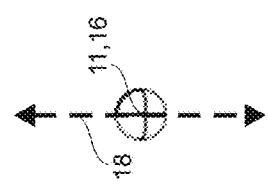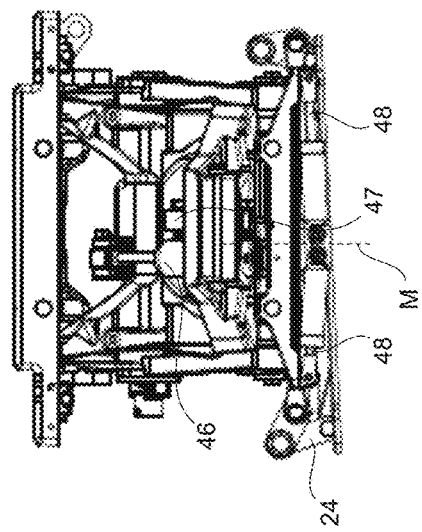
Fig. 9C Fig. 9A Fig. 9B

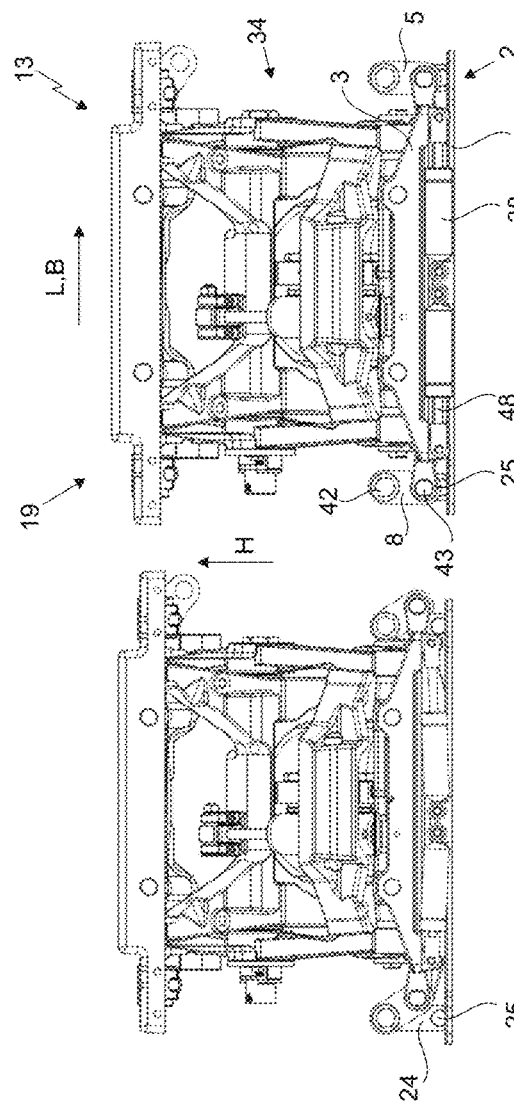

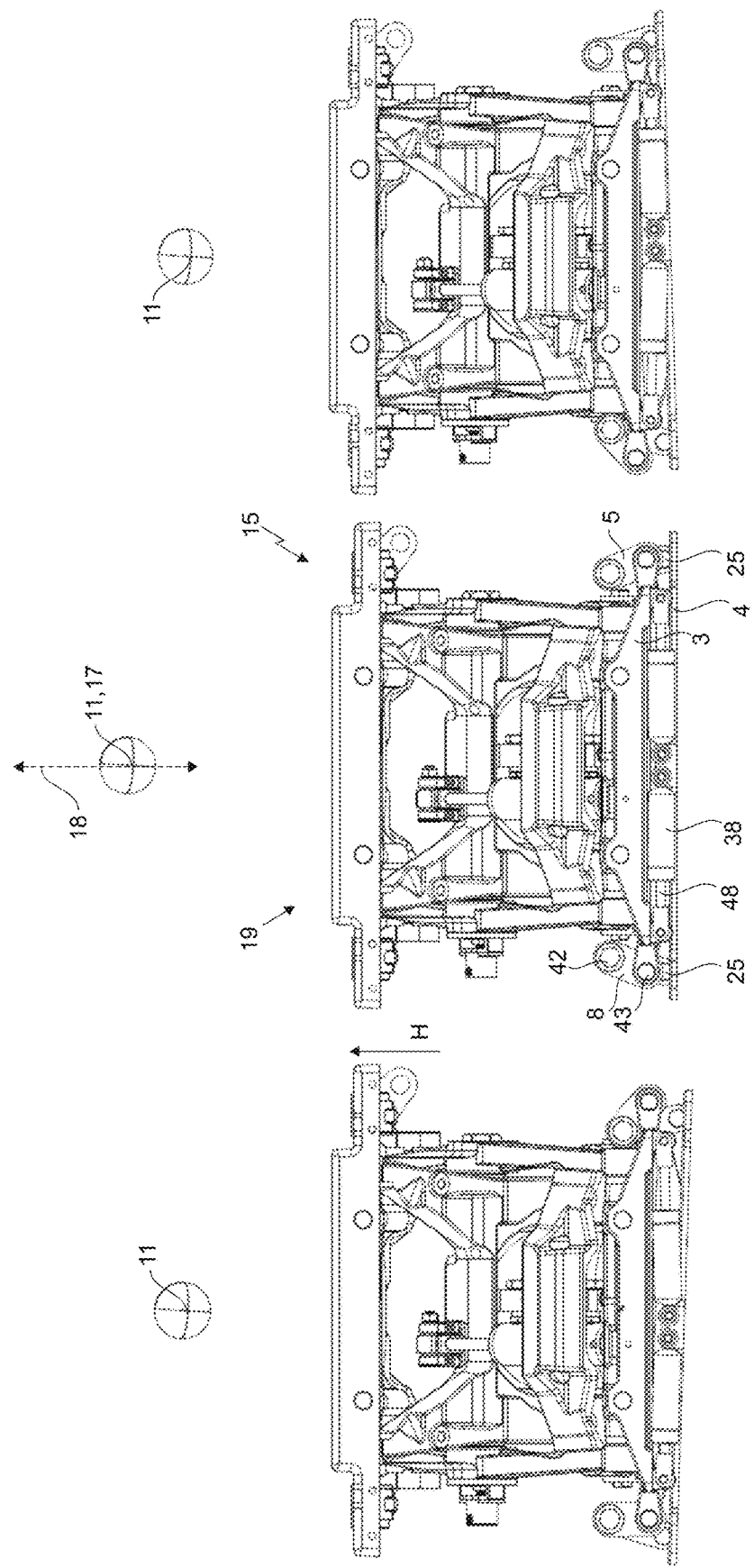

VEHICLE VIBRATION DEVICE

CROSS-REFERENCE TO RELATED APPLICATIONS

This application claims the benefit of German Patent Application No. 102015121764.3 filed Dec. 14, 2015, the entire contents of each of which are incorporated herein by reference.

FIELD

The invention relates to a vehicle vibration device for a vehicle seat and/or a vehicle cabin, comprising a lower part and an upper part which is resiliently mounted relative to the lower part by a damper means, the upper part being mounted in a suspended manner on the lower part by means of at least one pivot bearing, the at least one first pivot bearing comprising at least one first lever, the first end of which is attached to the lower part by a first pivot axis and the second end of which is attached to the upper part by a second pivot axis, the second end being located below the first end when viewed in a vertical direction.

BACKGROUND

During operation of a vehicle, the vehicle can undergo different movements due to external influences. These movements are generally translational movements along the longitudinal direction, the width direction and vertical direction of the vehicle, as well as rotations about each of these directions, also known as pitching, rolling and yawing, although yawing is not usually taken into consideration.

Vehicle vibration devices known from the prior art, in particular for vehicle seats, are configured such that they form an oscillating and resilient mounting between an upper part and a lower part, in this case between a vehicle seat part and a lower part of a vehicle seat sub-structure. For example, a vehicle seat can be connected by scissor arms to a seat part relative to a lower part which is attached to a vehicle cabin floor or to the body of the vehicle, suspension means and/or damper means also being arranged between the upper part and the lower part in order to resiliently absorb a vertically oriented vibration which is introduced into the system of the vehicle seat from the outside.

There are also horizontal vibration devices which are used to cushion or damp vibrations which are introduced horizontally into the system of the vehicle seat. For this purpose, the upper part of the vehicle seat is resiliently mounted horizontally relative to the lower part of the vehicle seat and can resiliently absorb vibrations which are introduced horizontally and transversally.

Furthermore, a vibration device for a vehicle seat or for a vehicle cabin is known from DE 10 2010 034 857. The vibration device described in that document comprises an upper part which is resiliently mounted relative to a lower part and has levers which assume a particular position between the upper part and the lower part. In this respect, the upper part is pivoted relative to the lower part about a fictive centre of rotation which is arranged below the upper part.

Since the centre of rotation cannot change its position in this case, the device is merely capable of effectively absorbing short-term rotations of a vehicle, in particular pitching and rolling movements, but not translational movements of the vehicle. Furthermore, this arrangement cannot appropriately compensate for the vehicle being on a slope.

SUMMARY

It is therefore the object of the present invention to provide a vehicle vibration device which can compensate for short-term rotations and translational movements of the vehicle and for journeys made by the vehicle on a slope.

This object is achieved according to the features of claim 1. Advantageous embodiments of the invention are found in the dependent claims.

The basic concept of the invention is to provide a vehicle vibration device for a vehicle seat or a vehicle cabin, comprising a lower part and an upper part which is resiliently mounted relative to the lower part by a damper means, the upper part being mounted in a suspended manner on the lower part by means of at least one pivot bearing, the at least one first pivot bearing comprising at least one first lever, the first end of which is attached to the lower part by a first pivot axis and the second end of which is attached to the upper part by a second pivot axis, and the second end being located below the first end when viewed in a vertical direction, at least the position of the first end of the lever being changeable by an adjustment means.

A rotation about a fictive or real axis which is arranged such that it runs in the width direction or longitudinal direction of the vehicle is achieved by the suspended mounting of the upper part relative to the lower part by means of at least one first lever. The axis is preferably a fictive axis.

Therefore, according to the invention, the position or location of the fictive or real axis can be changed, preferably in the vertical direction of the vehicle, as a result of changing the position of the first end of the first lever by the adjustment means. Thus, by changing the axis, a rotary field can be described which describes all the positions of the axis.

When travelling over uneven ground, for example the front wheel of the vehicle is deflected upwards or downwards, the result of which can be a rotational movement about a contact surface of a rear tyre. However, the inertia of the driver continues to move the vehicle seat and accordingly the driver himself in a translatory manner. The suspended mounting by the swivel means provides a degree of rotational freedom so that the driver is not subjected to the rotation of the vehicle while travelling over uneven ground.

According to a particularly preferred embodiment, the first pivot bearing comprises at least one second lever, the first end of which is arranged on the lower part by a first pivot axis and the second end of which is arranged on the upper part by a second pivot axis, the second end being located below the first end when viewed in the vertical direction.

More preferably, the first pivot bearing is configured to be axially symmetrical with respect to a centre axis of the lower part, as a result of which a particularly advantageous pivot movement of the upper part relative to the lower part is possible. In particular, the offset is substantially the same in every direction, particularly in the horizontal direction.

This is particularly advantageous because, due to the installation space and for safety reasons, the horizontal offset is restricted to approximately 50 mm total stroke, which corresponds to a left-hand and right-hand or front and rear offset of 25 mm.

According to another preferred embodiment, the vehicle vibration device comprises at least one second pivot bearing. In this respect, the lower part and the upper part can be advantageously interconnected by the at least one first and the at least one second pivot bearing.

Here, the first pivot bearing, like the second pivot bearing, advantageously comprises at least one lever, the first end of which is pivotally attached to the lower part by a first pivot axis and the second end of which is pivotally attached to the upper part by a second pivot axis, the second end being located above the first end. This means that the upper part is suspended on the lower part by means of suspended lever arms directed downwards or obliquely downwards, which lower part extends upwards, for example laterally on the left and on the right of the upper part or extends upwards laterally in the front and rear region of the upper part.

Since according to the invention the position of the first end of the first lever can be changed, it is thus also possible to change the position of the fictive or real axis. Changing the first end of the first lever spatially changes the position of the entire first lever, i.e. the type of pivot bearing can also be changed thereby. In principle, three fundamentally different positions of the first lever are possible in this case.

The first position is where the lever is oriented in the vertical direction of the vehicle. The second position is where the lever is arranged obliquely downwards and inwards from the first end thereof. The third position is where the lever is arranged obliquely downwards and obliquely outwards from the first end thereof.

By means of the adjustment means, it is therefore possible to change over between these three positions. This is preferably a continuous adjustment so that all conceivable positions between the different positions are possible. Therefore, the first end of the first lever can be moved continuously without interruption by the adjustment means.

In this respect, different embodiments are conceivable for the adjustment means. According to a first preferred embodiment, at least one first lever element of the lower part, which substantially extends in the vertical direction or at an angle to the vertical direction, can be pivoted about an axis of rotation by the adjustment means. Here, the first end of the first lever can preferably be connected to the first lever element by the first pivot axis.

This means that a pivot movement of the lever element of the lower part can change the position of the first end of the lever.

According to a particularly preferred embodiment, the adjustment means has at least one crank element, arranged on the lower part, having a first and a second end, a first end of a first connecting rod being pivotally arranged at least at the first end of the crank element, and a second end of the first connecting rod being pivotally arrangeable on the first lever element. The crank element is preferably mounted such that it can rotate about an axis of rotation.

Therefore, by actuating the crank element and due to the resulting movement of the connecting rod, it is possible to pivot or rotate the first lever element about the axis of rotation.

According to a more preferred embodiment, it is possible to arrange a first end of a second connecting rod on the second end of the crank element and the second connecting rod is pivotally connected to at least one second lever element of the lower part by a second end of the connecting rod. The second lever element of the lower part is preferably also pivotally mounted here. It is particularly advantageous if the adjustment means is configured such that actuation of the adjustment means symmetrically adjusts the first and second lever elements.

Another possible embodiment of the adjustment means is that the adjustment means comprises at least one actuator. This actuator can preferably be connected on one side to the lower part and on the other side to the first lever, as a result of which the first lever is pivotable about the axis of rotation. In this respect, a first end of the actuator can preferably be connected to the first lever element and a second end of the actuator can be connected to the second lever element.

Here, the actuator can be of a mechanical, pneumatic or hydraulic configuration. The actuator is preferably a hydraulic lifting cylinder.

Furthermore, according to a preferred embodiment, it is conceivable for the adjustment means to be actuated manually or automatically.

Manual actuation of the adjustment means can be carried out by the driver, for example, who then actuates the adjustment means manually for example and can adapt the position of the first end of the first lever according to the current driving situation.

Alternatively or additionally, it is conceivable for the adjustment means to be actuated automatically, preferably by an actuation means. Thus, it is conceivable here that, by means of sensors, for example acceleration sensors and position sensors, it is possible to determine the driving situation which currently exists. Thus, for example, a position sensor can be used to detect whether or not the vehicle is on an incline. A position sensor can be in particular an angle sensor so that a relatively long inclined journey can advantageously be effectively detected. An acceleration sensor can be used to determine whether or not the vehicle is travelling over uneven ground.

The data recorded by the sensors are preferably analysed by a computing unit and the computing unit accordingly activates the actuation means, the actuation means then actuating the adjustment means.

According to another embodiment, it is also conceivable for both manual and automatic actuation to be possible. Thus, a driver can set, in particular pre-set, a particular driving situation if the requirements which will be required can be foreseen. Take for example a driver driving a vehicle in a vineyard. Here, the preferred pre-setting is the slope adjustment. Nevertheless, it is then possible by the automatic actuation to be able to react to unforeseen uneven ground. After driving over uneven ground of this type, the slope compensation can be re-activated by the computing unit.

A preferred embodiment can provide that a pivot movement of the pivotable upper part can be subjected, by a damper means, to a damping force which counteracts the pivot movement, it being possible for the damper means to be connected to the first lever. Alternatively, the damper means can be arranged between the upper part and the lower part.

This arrangement makes it possible to reduce the pivot movement of the upper part relative to the lower part in a particularly effective manner.

According to a further preferred embodiment, the lower part is connected to a vehicle body part or frame and/or to a vehicle cabin part, which is connected to a lower part of the vehicle seat.

Subject to the kinematics present, another fictive axis, about which the lower part is rotated, is provided for the particular kinematics. For the kinematics of rotative isolation, the axis is located below the lower part and for the kinematics of slope compensation, the axis is located above the lower part. The kinematics for translatory isolation is a special case, because here the axis is in infinity. Therefore, it can be arranged above or below the lower part.

The underlying situation for rotative isolation and slope compensation is the same insofar as the vehicle undergoes a rotation, either by travelling over uneven ground or by travelling over a slope.

However, a driver has to establish a fundamental difference. In rotative isolation, the driver is normally in a horizontal position sitting on the vehicle seat so that he accepts temporary, sometimes also pronounced, deflections. In slope compensation, the utility vehicle is tilted relative to the horizontal for a relatively long period of time, so that consequently the driver does not want any great deflection relative to his original position.

In particular, it is possible to set the slope compensation such that the fictive axis is located in the region of the driver's upper body, whereas in rotative isolation, the axis is always arranged on the vehicle-side and below the driver. Therefore, the reference system of vehicle and driver changes due to the change between slope compensation and rotative isolation. As a result, it is possible to set the best kinematics for the driver according to his driving situation.

Further advantageous embodiments are found in the sub-claims.

BRIEF DESCRIPTION OF THE DRAWINGS

Further objectives, advantages and practicalities of the present invention can be found in the following description in conjunction with the drawings.

FIG. 2A schematically shows the translatory isolation;

FIG. 2B schematically shows the rotative isolation;

FIG. 2C schematically shows the slope compensation;

FIG. 4A-4C show kinematics of the particular isolation with an embodiment of the adjustment means;

FIG. 9A-9C show the rotative isolation of the vehicle vibration device according to FIG. 8;

FIG. 10A-10C show the translatory isolation of the vehicle vibration device according to FIG. 8; and FIG. 11A-110 show the slope compensation of the vehicle vibration device according to FIG. 8.

DETAILED DESCRIPTION

Figure 1:
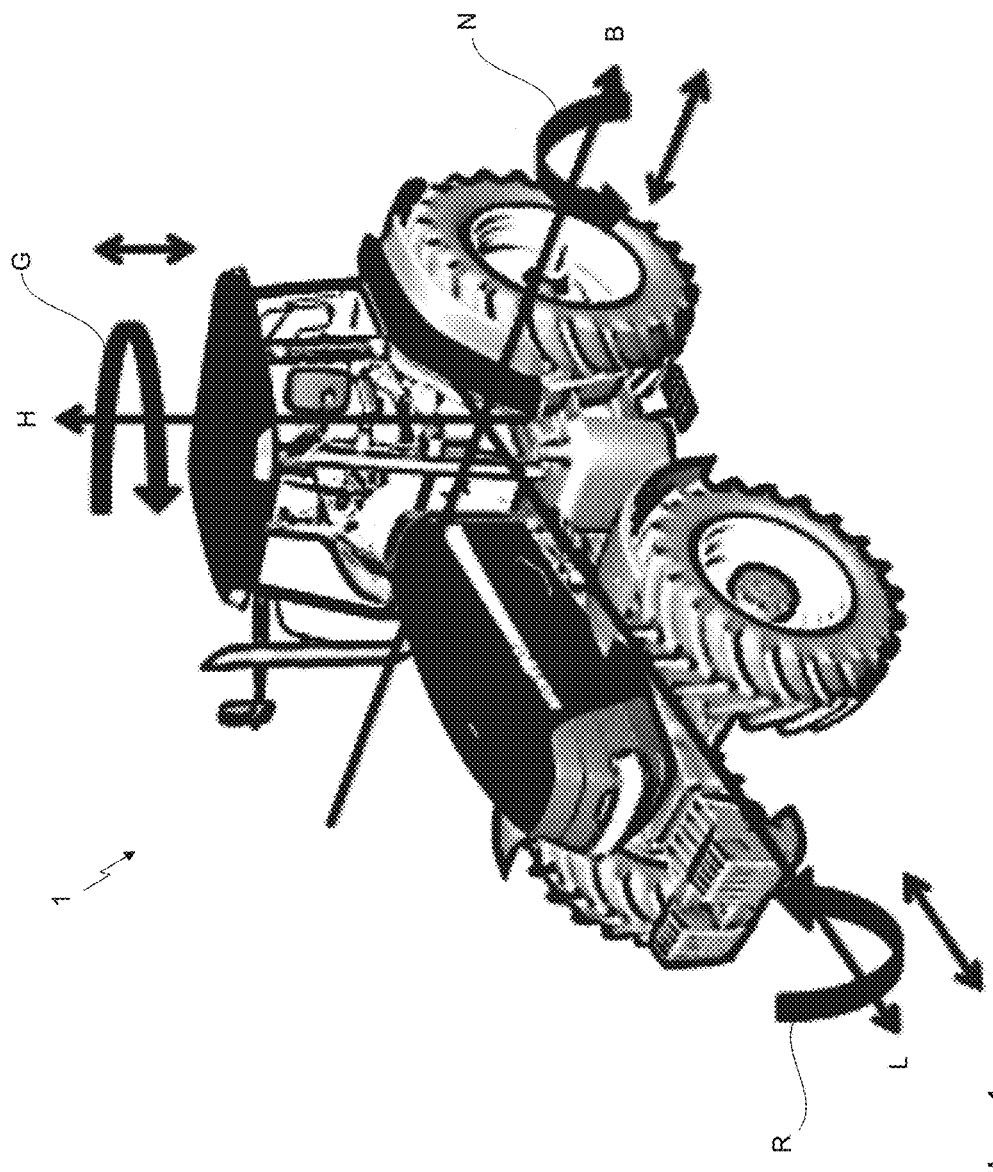
FIG. 1 shows a utility vehicle with the different movement possibilities.

The utility vehicle 1 shown in FIG. 1 indicates the typical movements of the utility vehicle, subject, of course, to the particular driving situation. Here, translational movements of the utility vehicle in the longitudinal direction L of the vehicle, in the width direction B of the vehicle and in the vertical direction H of the vehicle can occur. Furthermore, rotations about each of these axes L, B, H can occur, in which case a rotation about the longitudinal direction L is known as rolling R, a rotation about the width direction B is known as pitching N and a rotation about the vertical direction H is known as yawing G. Yawing is typically disregarded for the vehicles. According to the invention, it is possible to compensate for these movements, except for the insignificant yawing movement, by means of the vehicle vibration device 2.

The three basically different positions of the vehicle vibration device 2 are shown in FIG. 2A, 2B and 2C. The figures can have different scales. These positions are occupied when the upper part 3 does not vibrate relative to the lower part 4, i.e. when no external disruption or the like occurs.

FIG. 2A shows a first position, in particular of the first end 6 of the first lever 5. Here, the first end 6 of the first lever 5 is arranged above the second end 7 of the first lever 5 when viewed in the vertical direction H. A second lever 8 can also be seen, the second lever 8 being connected by its first end 9 to the lower part 4 and by its second end 10 to the upper part 3. Therefore, in the present case, the first lever 5 and the second lever 8 are parallel to one another and extend in the vertical direction H. The schematic vehicle vibration device 2 shown here is axially symmetrical to the centre axis M of the lower part 4. The first ends 6, 9 and the second ends 7, 10 form a parallelogram; when the upper part 3 pivots relative to the lower part 4, the upper part 3 and the lower part 4 remain parallel to one another. This position is particularly preferred for isolating translational movements and is referred to in the following as translatory isolation 13.

FIG. 2B shows, similarly to FIG. 2A, a first lever 5 and a second lever 8, the distance A of the respective second ends 7, 10 from the centre axis M being shorter than the distance A'.

Thus, the second ends 7, 10 have been moved further inwards. During a pivot movement of the upper part 3 relative to the lower part 4, the upper part 3 is no longer parallel to the lower part 4. This suspension describes in particular a rotation of the upper part 3 about a fictive axis 11 arranged below the upper part 3. This position is particularly preferred for isolating rolling and pitching movements and is referred to in the following as rotatory isolation 14.

FIG. 2C shows the same components as FIG. 2A and 2B, but the distance A of the second ends 7, 10 from the centre axis M is greater than the distance A' of the second ends from the centre axis M. Thus, the second ends 7, 10 have been moved further outwards. During a pivot movement of the upper part 3 relative to the lower part 4, the upper part 3 is no longer parallel to the lower part 4. This suspension describes in particular a rotation of the upper part 3 about a fictive axis 11 arranged above the upper part 3. This position is particularly preferred for isolating slopes and rolling and pitching movements and is referred to in the following as slope compensation 15.

Figure 3:
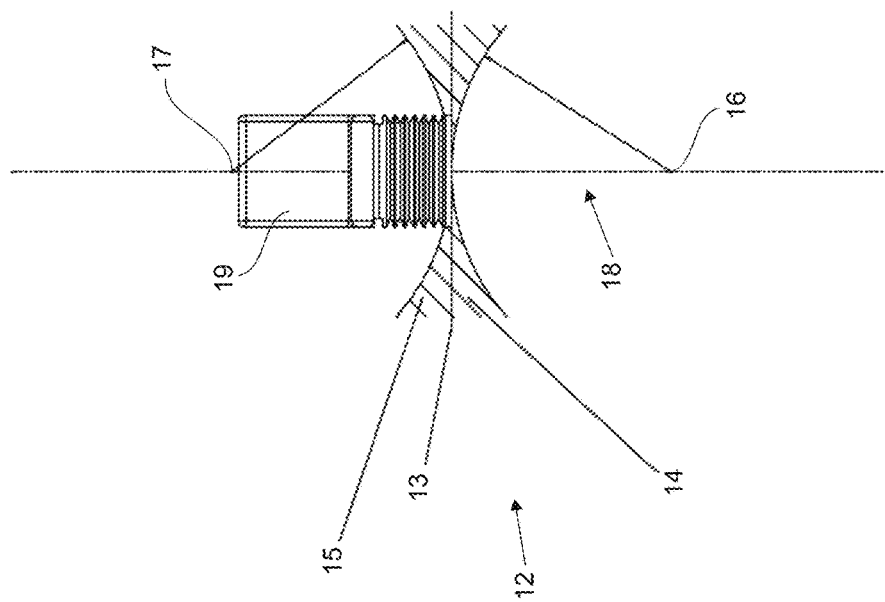
FIG. 3 schematically shows the adjustment region.

A possible adjustment region 12 and the position of the fictive axis 11 can be seen particularly clearly in FIG. 3.

In this respect, by way of example an axis of rotation 16 for the rotatory isolation and an axis of rotation 17 for the slope compensation are shown. The axis of rotation 16 is arranged below the upper part 3 and in particular below the lower part 4, and the axis of rotation 17 is arranged above the upper part 3 and above the lower part 4.

If the axis of rotation 16 is located below the upper part 3, a convex case is described, the system consisting of the vehicle vibration device 2 and, here, a vehicle seat 19 is located above a circular arc. The movement of the system substantially corresponds to the course of the circular arc or accordingly approximates the present kinematics.

The translatory isolation 13 is indicated by the straight line 13. Since in the case of a translatory isolation 13, the system moves along the straight line 13, no axis of rotation or centre of rotation is present. However, due to constructional tolerances and deviations, it is possible to start from an axis of rotation which is in infinity.

If the axis of rotation 17 is located above the lower part 4 and/or above the upper part 3, this is a concave case, i.e. the system moves within the variable circular arc.

The axis 18 indicates a possible rotary field or pivotal field, i.e. the axis of rotation can assume any value of the rotary field 18, subject to the current or desired driving situation.

FIG. 4A-4C show a vehicle vibration device 2 with a first embodiment, shown schematically, of an adjustment means 29, FIG. 4A showing the adjustment means 29 in the slope compensation position 15, FIG. 4B showing the adjustment means 29 in the rotatory isolation position 14 and FIG. 4C showing the adjustment means in the translatory isolation position 13.

Here, the adjustment means 29 comprises a crank element 20 which can be rotatably connected to a crank attachment 28 by a crank mount 27, the crank attachment 28 preferably being connectable, advantageously rigidly, to the lower side 4. Furthermore, it is advantageous if the crank attachment 28 substantially extends along the centre axis M of the lower side 4. Of course, other attachment options are also possible, the arrangement along the centre axis M being preferred, since a symmetrical configuration of the adjustment means 29 is possible. In particular, a first connecting rod 21 and a second connecting rod 22 can be configured identically.

The crank element 20 has a first end 30 and a second end 31, a first end 32 of the first connecting rod 21 being pivotally arranged at the first end 30 of the crank element 20 and a second end 33 of the first connecting rod 21 being pivotally arranged on a first lever element 23. The first lever element 23 can be pivotally connected to the lower part 4 by an axis of rotation 25.

Furthermore, a first end 32 of the second connecting rod 22 is pivotally arranged at the second end 31 of the crank element 20 and the second connecting rod 22 is arranged so as to be pivotable together with the second lever element 24 of the lower part 4 by a connection 26.

Therefore, due to this arrangement of the adjustment means 29, it is possible to pivot the first lever element 23 and the second lever element 24 about the axis of rotation 25 when actuating the adjustment means 29, here by rotating the crank element 20 about the crank mount 27 in a clockwise or anticlockwise direction. This pivoting movement of the lever elements 23, 24, which is preferably symmetrical, can change the position of the first ends 6, 9, as can be clearly seen from a comparison of FIG. 4A-4C.

Changing the position of the first ends 6, 9 changes the overall position of the levers 5, 8, in particular the angle formed by the particular lever 5, 8 and the centre axis M, is changed.

Figure 5A:
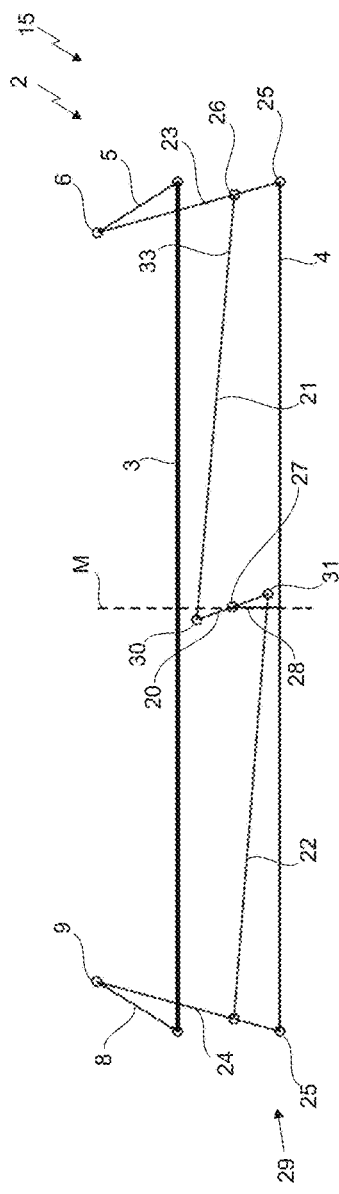
FIG. 5A-5C show kinematics of slope compensation with different driving positions.
Figure 5B:
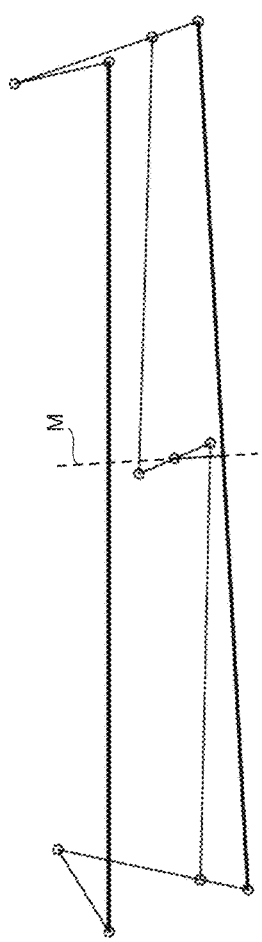
Figure 5C:
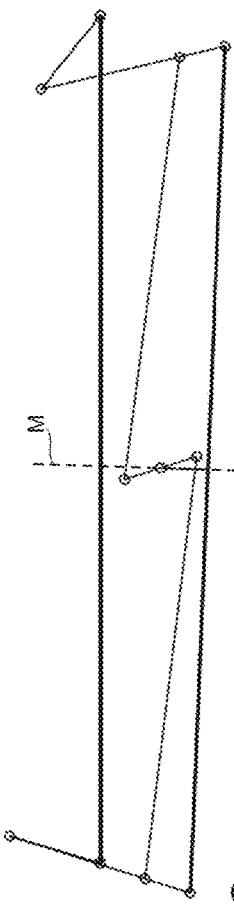

FIG. 5A-5C show the vehicle vibration device 2 in the slope compensation position 15. FIG. 5A shows the vehicle vibration device 2 in a position in which the utility vehicle 1 (not shown here) is not inclined. The lower side 4 which is preferably connected to a vehicle body part (not shown here) thus represents the position of the utility vehicle 1.

FIG. 5B shows a position in which the utility vehicle 1 is travelling along a slope which falls away to the left, the lower side 4 being oriented according to this slope. Due to this slope, the levers 5, 8 pivot accordingly relative to the lower side 4. In this respect, the upper side 3 is no longer parallel to the lower side 4.

As can be further seen, the position of the adjustment means 29 does not change when viewed relative to the lower side 4. This means that the lever elements 23, 24 are not pivoted.

FIG. 5C shows the situation when driving over a slope which falls away to the right.

Figure 6A:
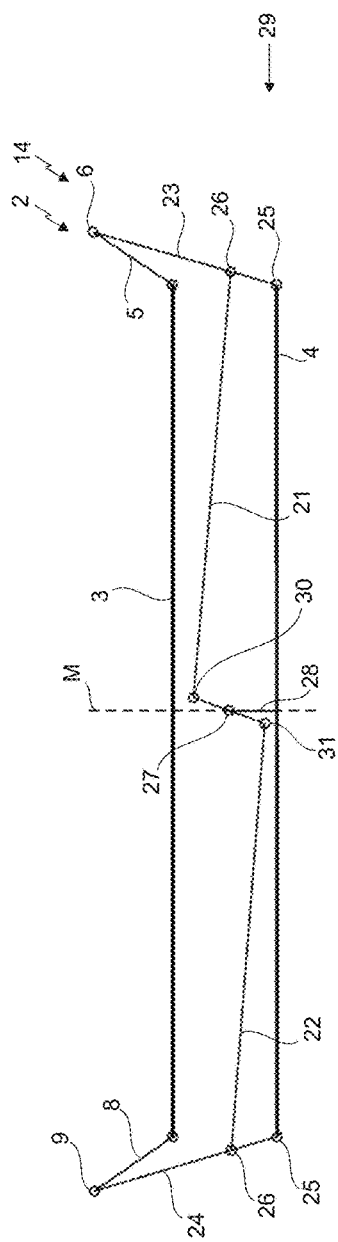
FIG. 6A-6C show kinematics of rotative isolation with different driving positions.
Figure 6B:
Figure 6C:
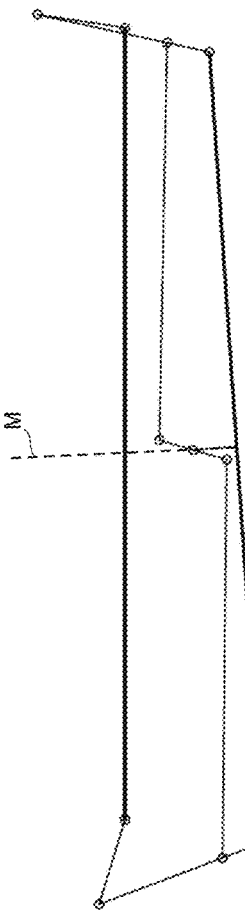

FIG. 6A-6C show the vehicle vibration device 2 in the rotatory isolation position 14, FIG. 6A showing the vehicle vibration device 2 without an external influence, FIG. 6B showing the travel over an elevation on the left-hand side of the vehicle and/or the travel through a depression on the right-hand side of the vehicle, and FIG. 6C showing the travel over an elevation on the right-hand side of the vehicle and/or the travel through a depression on the left-hand side of the vehicle.

Figure 7A:
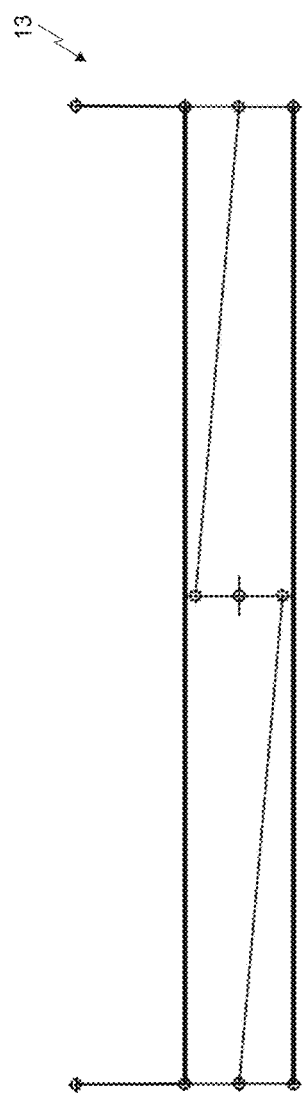
FIG. 7A-7C show kinematics of translatory isolation with different driving positions.
Figure 7B:
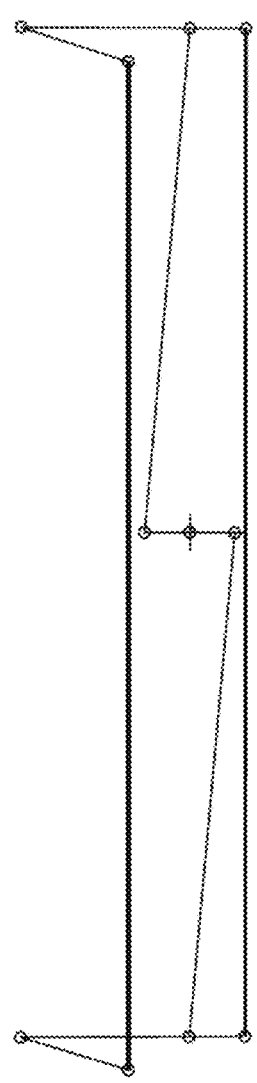
Figure 7C:
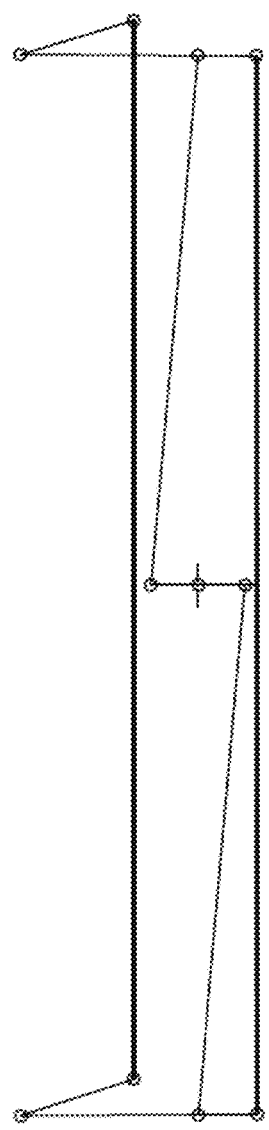

FIG. 7A-7C show the vehicle vibration device 2 in the translatory isolation position 13, FIG. 7A showing the vehicle vibration device 2 without an external influence. FIG. 7B shows a translational movement of the utility vehicle 1 and correspondingly of the lower side 4 to the right, and FIG. 7C shows a translational movement to the left.

Figure 8:
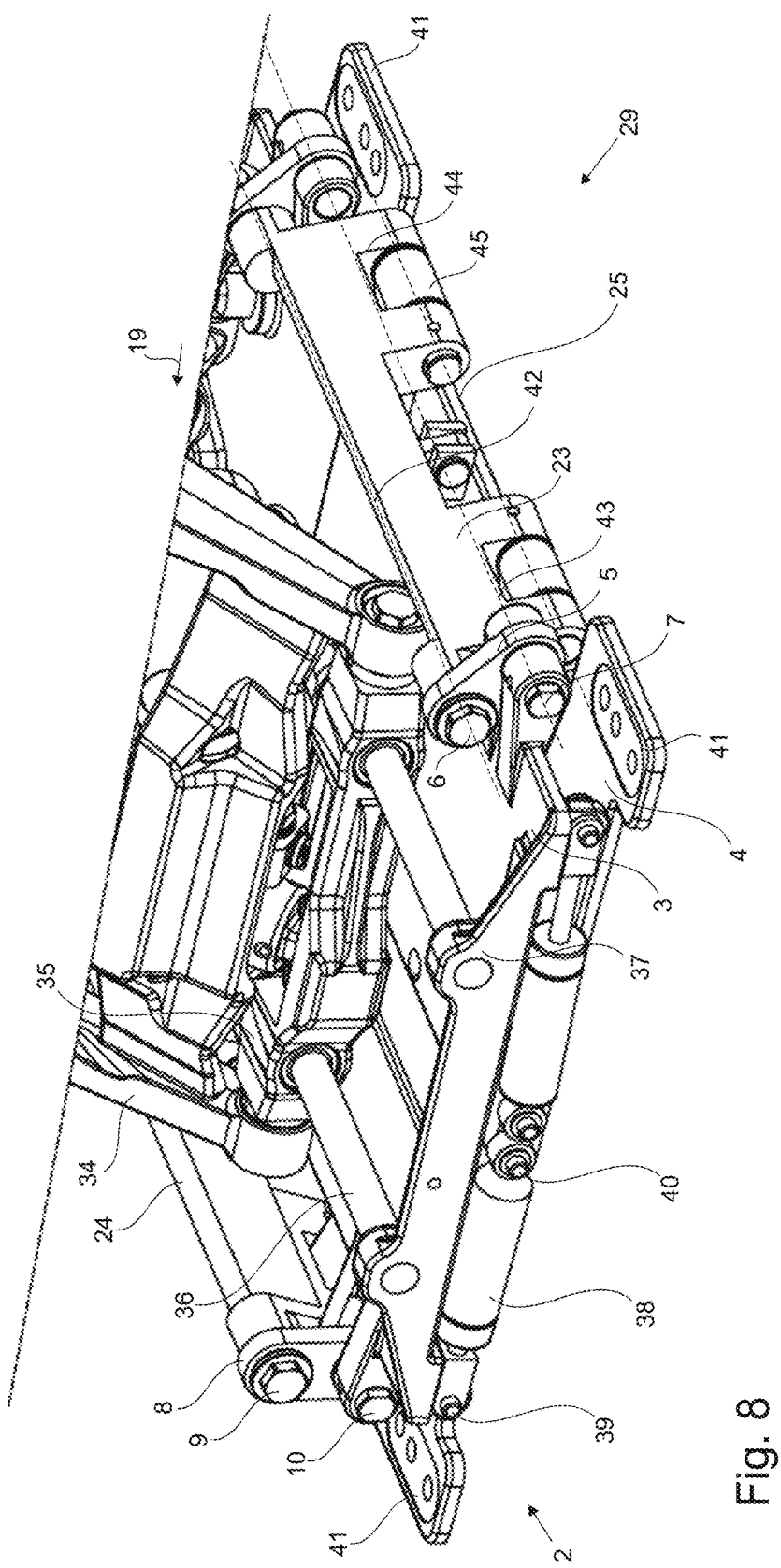
FIG. 8 is a perspective view of the vehicle vibration device.

FIG. 8 shows a more detailed embodiment of the vehicle vibration device 2. The figure shows the lower part 4 which can be attached to a body floor (not shown here) by at least one attachment device 41. Alternatively, it is conceivable for the lower part 4 to be configured as part of the body floor. Furthermore, it can be seen in FIG. 8 that arranged on the upper part 3 is a vehicle seat 19 which is shown as a detail here. The figure shows a scissor frame 34, a first end 35 of the scissor frame 34 being connected to a plain bearing 36. The plain bearing 36 is likewise connected to the upper part 3 by an attachment 37.

The figure also shows the upper part 3 which is mounted such that it oscillates relative to the lower part 4. In this respect, the upper part 3 is connected to the lower part 4 by a first lever 5 and by a second lever 8, the second end 7, 10 of the levers 5, 8, respectively, being connectable to the upper part 3 by a second pivot axis 43 and the first end 6, 9 of the levers 5, 8, respectively, being connectable to the lower part 4 by a first pivot axis 42. Here, the lower part 4 preferably comprises a first lever element 23 and a second lever element 24 which are each connectable to the lower part 4 by an axis of rotation 25 and are pivotable about this axis of rotation 25.

The first lever element 23 and the second lever element 24 are advantageously constructed in the same way, i.e. identically. Here, the lever elements 23, 24 are U-shaped, the ends of the U each having a recess 44, into which a corresponding counterpart 45 of the lower part 4 can engage. Of course, other configurations of the lever elements 23, 24 are also conceivable.

To obtain an appropriate damping, dampers 38 are arranged between the upper part 3 and the lower part 4 in this case, the dampers being connectable to the upper part 3 by a first end 39 and to the lower part 4 by a second end 40.

By pivoting the lever elements 23, 24, it is possible to change the position of the first end 6 of the lever 5. Thus, various options are possible for pivoting the lever elements 23, 24 about the axis of rotation 25. Thus, here it is particularly possible for the lever elements 23, 24 to be pivotable by an electric actuator, for example by a motor (not shown here). Of course, the previously described embodiments using a crank device or a pneumatic or hydraulic actuator are also conceivable.

FIG. 9A-9C show the vehicle vibration device 2 according to FIG. 8 in the rotatory isolation position 14, FIG. 10A-10C show the vibration device 2 in the translatory isolation position 13 and FIG. 11A-11B show the vibration device 2 in the slope compensation position.

FIG. 9A shows the situation without an external force acting on the utility vehicle and accordingly on the vibration device 2, FIG. 9B shows the situation while driving over an elevation on the right-hand side and/or while driving over a dip on the left-hand side, and FIG. 9C shows the situation while driving over an elevation on the left-hand side and/or while driving over a dip on the right-hand side. Furthermore, the corresponding fictive axis is shown, about which the vehicle vibration device 2 and in particular the lower side 4 is pivoted. Here, it should be pointed out that due to the underlying kinematics, the fictive axis 11 can be displaced to a certain extent in the vertical direction H. The displacement of the axis 11 is equivalent to a movement of the axis in the rotary field 18 (shown here only as a detail). However, the pivot movement about the axis 11 nevertheless corresponds substantially or approximately to a movement on the corresponding circular path of the fictive axis 11. Here, the axis 11 is located below the lower side 4 when viewed in the vertical direction H.

Furthermore, the figures clearly show how the vibration of the upper part 3 relative to the lower part 4 is damped by the dampers 38. Depending on the direction of rotation, a piston rod 48 of one damper 38 is extended to a greater extent and the piston rod 48 of the other damper 38 is retracted to a greater extent.

In addition, a comparison of FIG. 9A-9C shows that the position of the lever elements 23, 24 relative to the lower side 4 does not change. Furthermore, this is preferably a symmetrical construction of the vibration device 2 with respect to the centre axis of the lower side 4.

When the lower part 4 is pivoted about the axis 11, i.e. in an anticlockwise direction, the levers 5, 8 are also pivoted in an anticlockwise direction about the first pivot axis 42. The second pivot axis 43 also changes position by the levers 5, 8 according to the rigid connection. When the lower part 4 is pivoted about the axis 11 in a clockwise direction, the situation is completely reversed, and the levers 5, 8 are pivoted in a clockwise direction.

As already indicated, a vehicle seat 19 is arranged with the upper side 3 by means of a scissor frame 34. In this respect, the scissor frame further comprises a damper means 46 and a suspension means 47, so that the seat 19 can also be sprung and/or damped as before.

FIG. 10A-10C show the vehicle vibration device 2 in the translatory isolation position 13. The levers 5, 8 and the lever elements 23, 24 are substantially parallel to one another and are arranged such that they extend in the vertical direction. During a pivot movement, the upper side 3 and the lower side 4 also remain in parallel with one another. In the translatory isolation situation 13, axis 11 is not shown, because it is an axis which is at an infinite distance from the vibration device 2. Thus, this is a translational movement of the vehicle vibration device 2 and accordingly of the vehicle seat 19 in the longitudinal direction L or in the width direction B.

FIG. 11A-11C show the slope compensation situation 15. Here, the fictive axis 11 is located above the lower part 4 when viewed in the vertical direction H, and is particularly advantageously above the upper part 3. Similarly to the description given for FIG. 9A-9C, here as well the position of the axis 11 is not constant during a vibration due to the underlying kinematics, but the axis 11 can move slightly in the vertical direction in the rotary field 18 (shown only as a detail here).

All the features disclosed in the application documents are claimed as being essential to the invention insofar as they are novel over the prior art, either in isolation or in combination.

LIST OF REFERENCE NUMERALS 1 utility vehicle
2 vehicle vibration device
3 upper part
4 lower part
5 first lever
6 first end of first lever
7 second end of first lever
8 second lever
9 first end of second lever
10 second end of second lever
11 axis
12 adjustment region
13 translatory isolation
14 rotatory isolation
15 slope compensation
16 rotatory isolation axis of rotation
17 slope compensation axis of rotation
18 rotary field
19 vehicle seat
20 crank element
21 first connecting rod
22 second connecting rod
23 first lever element
24 second lever element
25 axis of rotation
26 pivotable connection
27 crank mount
28 crank attachment
29 adjustment means
30 first end of crank element
31 second end of crank element
32 first end of connecting rod
33 second end of connecting rod
34 scissor frame
35 first end of scissor frame
36 plain bearing
37 attachment of plain bearing
38 damper
39 first end of damper
40 second end of damper
41 attachment device
42 first pivot axis
43 second pivot axis
44 recess
45 counterpart
46 damper of the seat
47 suspension of the seat
48 piston rod
B width direction
L longitudinal direction
H vertical direction

What is claimed is:

1. A vehicle vibration device for a vehicle seat or a vehicle cabin, comprising:
   a lower part; and
   an upper part resiliently mounted relative to the lower part by a damper means,
   wherein the upper part is mounted in a suspended manner on the lower part by at least one first pivot bearing, the at least one first pivot bearing comprising at least one first lever, the first end of which is attached to the lower part by a first pivot axis and the second end of which is attached to the upper part by a second pivot axis, the second end being located below the first end when viewed in a vertical direction, wherein the first end of the first lever is connected to a first end of at least one first lever element at the first pivot axis, wherein a second end of the at least one first lever element is connected to the lower part at an axis of rotation, wherein at least the position of the first end of the first lever relative to the lower part can be changed by pivoting the at least one first lever element relative to the lower part about the axis of rotation using an adjustment means.

2. The vehicle vibration device according to claim 1, wherein the first pivot bearing comprises at least one second lever, the first end of which is arranged on the lower part by a first pivot axis and the second end of which is arranged on the upper part by a second pivot axis, the second end being located below the first end when viewed in the vertical direction.

3. The vehicle vibration device according to claim 1, wherein the vehicle vibration device has at least one second pivot bearing and the lower part and the upper part can be interconnected by the at least one first and at least one second pivot bearing.

4. The vehicle vibration device according to claim 1, wherein the at least one first lever element of the lower part substantially extends in the vertical direction or at an angle to the vertical direction.

5. A vehicle vibration device for a vehicle seat or a vehicle cabin, comprising:
a lower part; and
an upper part which is resiliently mounted relative to the lower part by a damper means,
wherein the upper part is mounted in a suspended manner on the lower part by at least one first pivot bearing, the at least one first pivot bearing comprising at least one first lever, the first end of which is attached to the lower part by a first pivot axis and the second end of which is attached to the upper part by a second pivot axis, the second end being located below the first end when viewed in a vertical direction, wherein at least the position of the first end of the first lever can be changed by an adjustment means, wherein at least one first lever element of the lower part, which substantially extends in the vertical direction or at an angle to the vertical direction, can be pivoted about a pivot axis by the adjustment means and the first end of the first lever being connected to the first lever element by the first pivot axis, and wherein the adjustment means has at least one crank element, arranged on the lower part, having a first and a second end, a first end of a first connecting rod being pivotally arranged at least at the first end of the crank element, and a second end of the first connecting rod being pivotally arranged on the first lever element.

6. The vehicle vibration device according to claim 5, wherein a first end of a second connecting rod is arranged on the second end of the crank element, and the second connecting rod is pivotally connected to at least one second lever element of the lower part by a second end of the connecting rod.

7. The vehicle vibration device according to claim 4, wherein the adjustment means comprises at least one actuator which can be connected to the lower part and by means of which the first lever element can be pivoted about the axis of rotation.

8. The vehicle vibration device according to claim 1, wherein the adjustment means can be actuated manually or automatically.

9. The vehicle vibration device according to claim 1, wherein a pivot movement of the pivotable upper part can be subjected, by a damper means, to a damping force which counteracts the pivot movement, it being possible for the damper means to be connected to the first lever, or the damper means being arranged between the upper part and the lower part.

10. The vehicle vibration device according to claim 1, wherein the lower part is a lower part of a vehicle seat which is connected to at least one of a vehicle body part, a frame, and a vehicle cabin part.

11. The vehicle vibration device according to claim 1, wherein the second end of the first lever is unchanged during a pivoting movement of the first end of the first lever.

12. The vehicle vibration device according to claim 5, wherein the second end of the first lever is unchanged during a pivoting movement of the first end of the first lever.

* * * * *